Feb. 13, 1962  J. E. PEIRCE ET AL  3,021,202
DISCHARGE SEAL DEVICE FOR ROTATING VESSELS
Filed July 10, 1959

INVENTORS.
John E. Peirce
Jack H. Phillips
BY
Thos E Scofield
ATTORNEY.

United States Patent Office 3,021,202
Patented Feb. 13, 1962

3,021,202
DISCHARGE SEAL DEVICE FOR
ROTATING VESSELS
John E. Peirce, Joliet, Ill., and Jack H. Phillips, Tulsa, Okla., assignors to Ozark-Mahoning Company, Tulsa, Okla., a corporation of Delaware
Filed July 10, 1959, Ser. No. 826,179
10 Claims. (Cl. 23—286)

This invention relates to rotating vessels adaptable to operations where solid and gases or vapors are involved and where separate discharge of these is required and refers more particularly to means for sealing output discharge openings from such vessels against gas passage.

In the practice of manufacturing processes involving the evolution of gases or vapors, it is often desirable to remove solids from the chamber containing the gas or vapor through a port sealed by a gas tight mechanism. As an example, in the production of hydrogen fluoride gas, fluorspar and sulfuric acid are reacted in a horizontal rotary reactor to produce an HF gas which is discharged from an end of the reactor through an exit pipe. Powdered and granular calcium sulfate remains in the reactor vessel, and must be disposed of. In a continuous process for the production of HF gases, it is preferable that this disposal be made continuously, so as not to interrupt the process of manufacture of the HF gas.

The art is cognizant of various devices which have been used to accomplish the removal of the calcuim sulfate in a continuous stream. These conventional devices have had a prominent weakness in that they have had to employ rotary mechanical seals. The purpose of such rotary mechanical seals is to seal the device against (1) the leakage out of the HF gas, if the reactor was operating under a slight pressure, or (2) leaking in of air, if the reactor was operating under a slight negative pressure. Leakage of HF gas out, besides being a production loss, is a health hazard. Leakage in of air both causes corrosion and interferes with the later processing of the HF gas, especially with condensation thereof to anhydrous hydrofluoric acid.

Seals used for rotating reactors are designed to be at least theoretically coaxial with the reactor. However, it is well known that, in actual operation, these seals are almost always out of alignment to a greater or lesser extent. This causes considerable difficulty in maintaining leak proof seals. Tendency for gas leakage at the seal has been so pronounced that, particularly in the manufacture of noxious gases, it has been the practice almost universally to operate generators under negative pressure in order to prevent escape of harmful gases to the atmosphere. The result of negative pressure operation, as set forth above, is the infiltration of air through the seal, diluting the gas stream. Such dilution in addition to the above mentioned difficulties requires the use of gas purification and recovery apparatus substantially larger than would be needed if the dilution could be avoided.

Specifically, a first well understood mechanism for discharging calcium sulfate from HF reactors comprises a screw conveyor, the casing of which is bolted to and rotates approximately coaxially with the reactor. Suitable means are provided inside the reactor to charge the calcium sulfate to the conveyor. Discharge of the conveyor is to a sealed box or tank, which, in turn, discharges to a sealed mechanism such as a star valve. The numerous objections to this construction include:

(a) Where the screw conveyor casing enters the box, it must be provided with a rotating seal subject to rotating and eccentric motion, the latter due to misalignment with the reactor. The seal is also subject to vertical and lateral misalignment due to the heating and cooling of the reactor.

(b) The screw conveyor shaft entering the box must be provided with a seal.

(c) The box discharge must be provided with a seal. If the latter seal is the usual star valve, a volume of air, equivalent at least to the volumetric measurement of the star valve if it is mechanically tight (which it never is) enters the reactor each revolution of the valve, when operating under negative pressure. If operation is under positive pressure, HF gas will leak out.

A second known mechanism for discharging calcium sulfate from HF reactors is to provide a screw conveyor with a casing which is stationary and mounted approximately coaxial with the reactor vessel. Suitable means are provided inside the reactor to charge calcium sulfate to the conveyor. The latter discharges to an open chute, either through a star valve or over a weir. The numerous objections to this construction include:

(a) Where the screw conveyor casing enters the reactor, it must be provided with a seal subject to rotating and eccentric motion, the latter due to misalignment with the reactor. Heating and cooling of the reactor make the casing subject to vertical and lateral misalignment.

(b) When the discharge of the screw conveyor is provided with a star valve, the star valve objection, supra, applies.

(c) When the discharge of the screw conveyor is provided with a weir, under certain circumstances, leakage into or out of the reactor will take place, due to voids that may occur in the conveyor or weir. If the process is a corrosive one, difficulties with seals are multiplied.

Therefore, an object of the instant invention is to provide a discharge seal mechanism for rotary reactors which enables the reactor to operate at a slight positive pressure without leakage of gas from the reactor.

Another object of the invention is to provide means for sealing a discharge port from a rotary reactor which maintains the seal integrity in constant fashion under heavy use over long periods of time without excessive wear of the parts. Another object of the invention is to provide a discharge seal mechanism for rotary reactors which permits the continuous discharge of solid material from the rotary reactor without egress of gas therefrom which is simple in construction, reliable in operation, relatively inexpensive to apply and maintain and has all the parts thereof readily accessible for replacement or repair.

Yet another object of the invention is to provide a discharge seal construction for rotary reactors which permits the continuous discharge of solid materials from a rotary reactor while maintaining a gas tight seal, does not employ mechanical seals and which will operate without flaw even if substantially out of alignment during operation.

Another object of the invention is to provide a discharge seal mechanism for rotary reactors which automatically compensate for changes in alignment of the reactor vessel due to operation over a long period of time.

Still another object of the invention is to provide a gas sealing discharge mechanism for rotary reactors which operates continuously without failure despite changes in alignment of the reactor vessel and which avoids stress or wear on any of the parts of the discharge seal mechanism despite operation thereof out of alignment.

Another object of the invention is to provide a discharge seal mechanism for rotary reactors wherein the discharge mechanism includes a spiral conveyor wherein no seal for the conveyor shaft is required.

Another object of the invention is to provide such apparatus wherein there is no discharge of gas from the reactor at the actual discharge point at the discharge valve and wherein there is no possibility of input air contamination at the same point.

Another object of the invention is to provide such a discharge seal device for rotating vessels wherein gases or vapors are evolved and wherein there is no positive requirement that the reaction vessel be maintained under either positive or negative pressures.

Yet another object of the invention is to provide a discharge seal device and mechanism for rotating vessels wherein gases or vapors are evolved and optionally employed in the production of hazardous gases wherein there are obviated the corrosion and larger purification apparatus problems of negative pressure and also the health problems and production loss problems of positive pressure operation of the reactor vessel.

Other and further objects of the invention will appear in the course of the following description thereof.

In the drawings, which form a part of the instant invention and are to be read in conjunction therewith, an embodiment of the invention is shown and, in the various views, like numerals are employed to indicate like parts.

Figure 1:
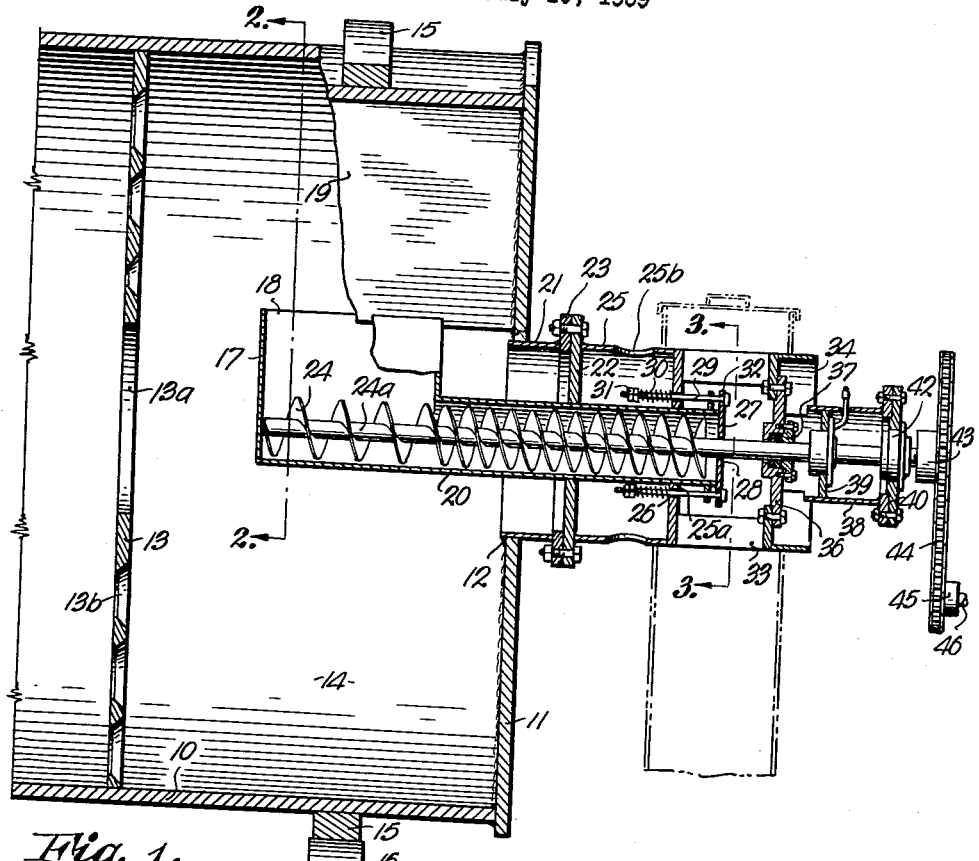
FIG. 1 is a side sectional view of the discharge end of a rotary reaction vessel with the inventive discharge seal mechanism and device installed therein.
Figure 2:
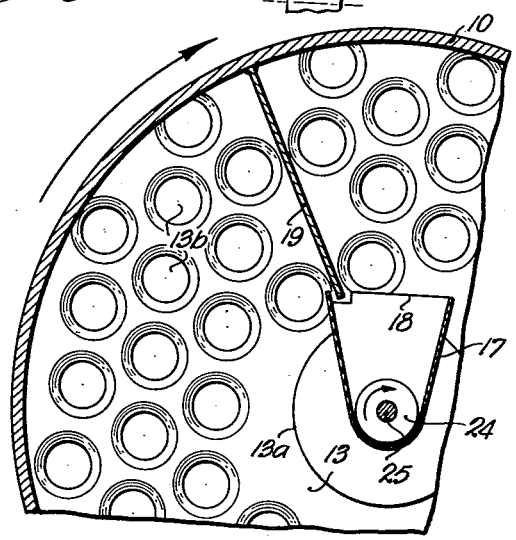
FIG. 2 is a view taken along the line 2—2 of FIG. 1 in the direction of the arrows.
Figure 3:
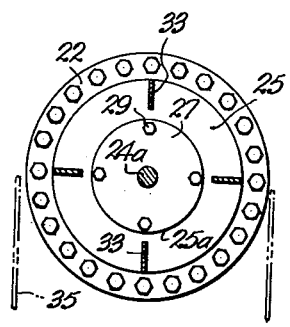
FIG. 3 is a view taken along the line 3—3 of FIG. 1 in the direction of the arrows.

The inventive device is optionally used for removing any dry or damp solid from a rotating chamber in a process where both a gas and a solid are produced, and must be removed separately without any loss of gas to the outside or entrance of air into the reaction chamber. Typical examples of such reactions are as follows:

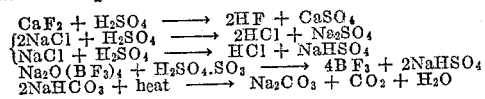

The inventive apparatus will be described in connection with the manufacture of hydrogen fluoride gas from fluorspar and sulfuric acid. The HF reactor itself is a horizontal steel cylindrical vessel rotating on trunnions at three to five r.p.m., much the same as a rotary dryer. Finely ground fluorspar is accurately weighed and fed into the front end of the reactor by means of a screw conveyor. Strong sulfuric acid is accurately metered through a separate pipe into the front end of the reactor. (The front end of the reactor is not shown in the drawing as it does not constitute an inventive part of the instant apparatus. It is described to give a background for the specific chemical reaction illustrating the device and the type of reactor in which the invention may be employed.) An air tight seal is maintained between the stationary feeding mechanism and the rotating reactor. The HF gas is removed from the front end of the reactor, through the same sealed housing that the feed screw and acid pipe enter the generator. A good external air tight seal for the front or feed end of the generator is necessary, but will not be described here. Since the reaction within the reactor is endothermic, it is necessary to heat the reactor indirectly by means of a heating shell around the reactor shell. The temperature within the reactor is such that a gas discharge temperature is maintained between 300° and 350° F. The interior of the reactor contains lifting bars and rails or balls for mixing, granulating and insuring good heat transfer by removing any scale or caking on the walls of the generator. The reaction which takes place within the reactor is illustrated by the following:

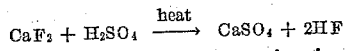

The residue remaining from the reaction is calcium sulfate containing three or four percent sulfuric acid and is removed by the discharge seal device to be described.

Referring to the drawings, the numeral 10 indicates the side wall of the cylindrical horizontal reactor having an end plate 11 fixed thereto with a port or opening 12 centrally formed therein. A baffle plate 13 is mounted centrally of the reactor having an enlarged central opening 13a and a plurality of spaced passages 13b therethrough. Plate 13 defines, with the end plate 11, a reactor discharge chamber generally designated 14. Bearing rings 15 rotatably mount the reaction vessel on roller bearing supports 16.

Hopper 17, having rectangular opening 18, tapered side walls and straight end walls, is fed into from a lifting plate 19 which is permanently mounted to the reactor by welding or other suitable means of attachment. Hopper 17 is fixedly attached to screw conveyor case 20. Case 20 is removably fixed to discharge tube 21 (sealingly fixed in opening 12) by means of circumferential flange 22, which bolts to flange 23 fixed to tube 21. Flange 22 is fixedly and sealingly attached to the outside of casing 20. Lifting plate 19, hopper 17, screw conveyor case 20, discharge tube 21, and flanges 22 and 23 remain in the same relationship to each other at all times and are attached to and rotate with the reactor vessel.

A screw conveyor flight 24 of increased amplitude in the hopper 17 and decreased amplitude in the case 20 is fixed to and rotates with conveyor shaft 24a. The pitch of the conveyor flight 24 and number of flights are dependent upon the physical characteristics of the material to be moved through the conveyor casing. With lesser amplitude greater and more even compaction are achieved. The distance of extension of the flight from the discharge plate depends on the compactibility of the material. Flight 24 terminates short of the discharge end of casing 20 whereby to provide a space in the discharge end of the casing 20 for formation of a plug of the material to be discharged from the casing. A cylindrical housing 25 is fixed to the outer surface of flange 22, has an opening 25a in its outer end through which the casing 20 extends, a plurality of openings 25b extending through the side wall thereof and a plurality of smaller openings 26 through the outer end thereof circumferential to the central opening 25a. A circular plate 27 of greater diameter than the diameter of the casing 20 and having opening 28 centrally thereof for the passage of shaft 24a therethrough is mounted on the end of the casing by a plurality of elongate bolts 29. Bolts 29 pass through openings in the peripheral edge of plate 27 and openings 26 in housing 23 and are spring loaded interiorly of the housing 23 by springs 30 abutting the inside face of the outer end of the housing and nuts 31 on bolts 29. Adjustment of bolts 31 on threaded portions of bolts 29 adjusts the tension of the springs 30 and the force with which plate 27 is applied to the end of the casing 20. A circumferential flange 32 having a plurality of openings therethrough receives the shafts of bolts 29.

Holes 25b in the housing 25 permits access to adjust the tension on springs 30 by tightening or loosening nuts 31. The pressure from plate 27 insures that a plug seal is maintained at all times at the end of the conveyor case, even in the event feed from lifting plate 19 ceases. The fit of opening 29 around shaft 24a is sufficiently close that the plug formed will seal against gas escape through said opening. The plug seal prevents either the entrance of air from outside of the vessel or escape of gas from within the reactor vessel.

Since all components of the above-described seal construction are permanently attached to the reactor vessel and rotating therewith at the same rate, the seal at plate 27 is not affected, as would be the case in the previously-described conventional seals, by the following-described reactor eccentric rotation. While the reactor vessel and all equipment attached thereto appear coaxial on the drawing, it should be understood clearly that because of irregularities arising largely from wear and tear and warping caused by heat, the axis of rotation of the reactor vessel is variable and, in operation, is almost always out of alignment with the true axis of the reactor vessel. Further wear and tear of the mounting roller 16 and the associated track 15 causes the reactor to have a small but appreciable axial movement relative to the true axis of the vessel. Both of these movements contribute to gas leakage out of or air leakage into reactors with conventional seals where it is necessary to seal between the moving reactor and a stationary discharge means or pipe.

Four bars 33 are rigidly fixed between the outer faces of housings 25 and 34 and mount bearing housing 34. The open space between bars 33 allows the material being discharged from the casing 20 to fall into a discharge chute 35 or into any other desired means or method for collecting or taking away discharge material. Supporting plate 36 is rigidly bolted to housing 34 and carries stuffing box 37. Secondary bearing housing 38 is rigidly attached to plate 36 and mounts secondary and tertiary bearing plates 39 and 40 carrying secondary and tertiary bearings 41 and 42 in openings therethrough. Stuffing box 37 protects bearings 41 and 42. Bearings 41 and 42 carry shaft 24a. Driven sprocket 43 is fixed to shaft 24a and rotated through flexible chain 44 connecting with drive sprocket 45. The latter is connected to drive shaft 46 propelled by means of a variable speed drive electric motor or any other suitable conventional source of power.

The direction of rotation of driven sprocket 43 is preferably the same as the rotation of the reactor vessel so that the horsepower required to turn the screw conveyor flight 24 will be assisting the drive rotating the reactor vessel instead of working against it. The number of revolutions per minute of the conveyor case 20 is the same as the reactor vessel. The number of revolutions per minute of the conveyor flight 24 is always greater than case 20. The number of revolutions traveled by the conveyor flight in excess of the revolutions of the reactor vessel depends upon the amount of material required to be removed from the reactor.

The same eccentric rotation which causes excessive wear on conventional seals is taken care of at the drive point between driven sprocket 43 and drive sprocket 45 by means of slack in chain 44.

In the specific reaction described, calcium sulfate contains liquid in the form of sulfuric acid, most probably in the limits of one to five percent free sulfuric acid. The calcium sulfate thus has the characteristics of compaction when subjected to pressure. When handled in a conveyor of the design outlined, the seal extends along the whole length of the conveyor from the inner end of the casing 20 to the plate 27. When feed to the hopper is stopped, the discharge from the conveyor becomes a dribble when the hopper is empty, but the plug is still continuous from the beginning of the casing in the vessel to the plate 27. In order to discharge this plug, a time of about 13 minutes is required to stop the dribble and reduce the length of the plug. Even after this time, the plug exists for a considerable distance along the conveyor, causing an effective gas seal.

The inventive apparatus could exhaust the vessel against the rotation thereof if the screw flight were reversed. However, this is less efficient.

It is probably true that the conveyor as specifically illustrated will provide a plug seal only with moist material. However, for dry material, a longer flightless portion at the conveyor end next the plate 27 provides the desired plug seal.

The vessel generally operates at a slightly negative pressure but plugging of some portion of the vessel or unit may swing the pressure over to the positive side. Either situation is taken care of by the instant invention.

From the foregoing it will be seen that this invention is one well adapted to attain all of the ends and objects hereinabove set forth together with other advantages which are obvious and which are inherent to the structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

Having thus described our invention, we claim:

1. In a cylindrical vessel rotatable around its longitudinal axis in a substantially horizontal orientation, an opening in one end of the vessel on the axial line, a spiral conveyor case positioned in said opening and extending into said vessel with its longitudinal axis on the axis of the vessel, means fixing said case to said vessel to rotate therewith and fix its position in said opening, a spiral conveyor on a conveyor shaft rotatably mounted in said case and extending both into and outside of said vessel, means in said vessel for feeding material therefrom into said case, means on the end of the case external of the vessel resiliently resisting extrusion of material therefrom whereby to force formation of a gas sealing plug in said case and means for rotating said conveyor shaft resiliently coupled therewith whereby to permit motion of the conveyor shaft relative the rotating means without stressing the former.

2. Apparatus as in claim 1 wherein the conveyor flight is of lesser amplitude adjacent the resilient means.

3. Apparatus as in claim 1 wherein the means rotatably mounting the conveyor shaft comprises a bearing mounting frame fixed to the vessel outside of said case external end.

4. Apparatus as in claim 1 wherein the means for rotating the shaft rotates it in the same direction as the vessel but at a greater velocity of rotation.

5. In a cylindrical vessel rotatable around its longitudinal axis in a substantially horizontal orientation, an opening in one end of the vessel on the axial line, a spiral conveyor case positioned in said opening and extending into said vessel with its longitudinal axis on the axis of the vessel, means fixing said case in sealing fashion to said vessel to rotate therewith and fix its position in said opening, a spiral conveyor on a conveyor shaft rotatably mounted in said case and extending both into and outside of said vessel, means in said vessel for feeding material therefrom into said case, a flange fixed to the outside surface of said conveyor case externally of said vessel extending substantially normal to the axis of said case, a spring-loaded plate covering the end of said case mounted on said flange, and means for rotating said conveyor shaft resiliently coupled therewith whereby to permit motion of the shaft relative the rotating means without stressing the former.

6. Apparatus as in claim 5 including a bearing frame positioned outside of said case relative said vessel, said bearing frame carrying at least two bearings encircling and supporting said conveyor shaft, said frame fixed to said flange by means spacing said frame clear of said plate.

7. In a cylindrical vessel rotatable around its longitudinal axis in a substantially horizontal orientation, an opening on one end of the vessel on the axial line, a cylindrical wall of lesser internal diameter than the internal diameter of the vessel mounted in said opening and extending axially externally of said vessel, a spiral conveyor case positioned in said opening and wall and extending both into and externally of said vessel and wall with its longitudinal axis on the axis of the vessel, a flange circumferentially fixed to the outside surface of said case and fixed to the free end of said wall external of said vessel, a spiral conveyor on a conveyor shaft rotatably mounted in said case and extending both into and outside of said vessel, said shaft extending outside of said case externally of said vessel, means in said vessel for feeding material therefrom into said case, means on the end of the case external of the vessel resiliently resisting extrusion of material therefrom whereby to force formation of a gas sealing plug in said case, and means for rotating said conveyor shaft resiliently coupled therewith whereby to permit motion of the shaft relative the rotating means without stressing the former.

8. Apparatus as in claim 7 wherein the resilient means comprises a spring loaded plate fitting over the end of the case, said plate supported by a second flange attached to the periphery of the case.

9. Apparatus as in claim 7 wherein the first flange is removably attached to the end of said wall.

10. In a cylindrical vessel rotatable around its longitudinal axis in a substantially horizontal orientation, an opening in one end of the vessel on the axial line, a spiral conveyor case positioned in said opening and extending into said vessel with its longitudinal axis on the axis of the vessel, means fixing said case in sealing fashion to said vessel to rotate therewith and fix its position in said opening, a spiral conveyor on a conveyor shaft rotatably mounted in said case and extending both into and outside of said vessel, means in said vessel for feeding material therefrom into said case, means on the end of the case external of the vessel resiliently resisting extrusion of material therefrom whereby to force formation of a gas sealing plug in said case, said conveyor shaft extending through said resilient means externally of said case, a sprocket on said conveyor shaft external of said case, a power source, a shaft connected to said power source having a sprocket thereon, and a resilient connection between said two sprockets whereby to permit motion of the conveyor shaft relative the other shaft without stressing either.

References Cited in the file of this patent

UNITED STATES PATENTS

| | | |
|---|---|---|
| 2,203,666 | Bonotto | June 11, 1940 |
| 2,499,157 | Peirce | Feb. 28, 1950 |
| 2,698,789 | Segl | Jan. 4, 1955 |